A. FAGERSTROM.

Tire-Tightener.

No. 70,183. Patented Oct. 29, 1867.

Witnesses:
Theo Tusche
J. Alison Fraser

Inventor:
A. Fagerstrom
Per Munn & Co.
Attorneys

United States Patent Office.

ANDERS FAGERSTRÖM, OF WYOMING, PENNSYLVANIA.

*Letters Patent No. 70,183, dated October 29, 1867.*

---

IMPROVEMENT IN SETTING TIRES ON WHEELS.

---

*The Schedule referred to in these Letters Patent and making part of the same.*

---

TO ALL WHOM IT MAY CONCERN:

Be it known that I, ANDERS FAGERSTRÖM, of Wyoming, in the county of Luzerne, and State of Pennsylvania, have invented a new and useful Improvement in Setting Tires on Wheels; and I do hereby declare that the following is a full, clear, and exact description thereof, which will enable others skilled in the art to make and use the same, reference being had to the accompanying drawings, and to the letters of reference marked thereon.

This invention relates to a new and improved mode of setting tires on wheels, as hereinafter fully shown and described, whereby the tire, by a very simple manipulation, may be tightened or loosened on the wheel, as the condition of the latter may require—tightened during the summer season, when the wheel is dry and the wood consequently contracted, and loosened during the fall or winter, when the wood is moist and consequently swollen. The object of the invention is to have the tire bind at all times properly on the wheel, so as to keep the spokes firmly in the hub and the rim firmly on the spokes, and thereby avoid all working of the parts which would otherwise be occasioned by shrinkage, and also avoid an undue pressure of the tire by the swelling of the wood, which frequently causes the spokes to bend, and gives the wheel too much "dish," either condition being very detrimental to the wheel. In the accompanying sheet of drawings—

Figure 1:
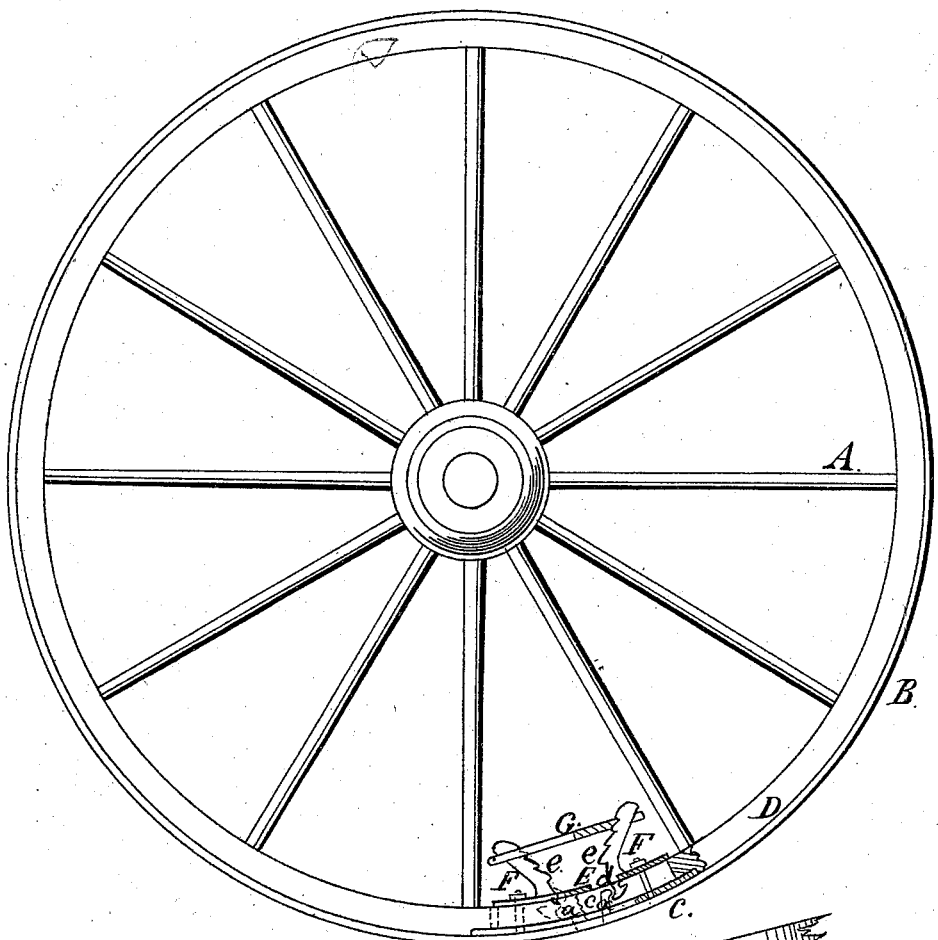

Figure 1 is a side or face view of a wheel having a tire secured upon it according to my invention.

Figure 2:
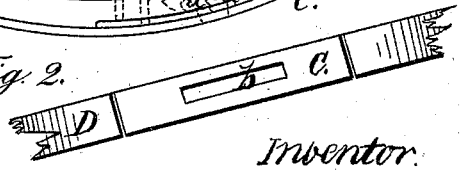

Figure 2, a view of a portion of the outer side of the rim of the wheel.

Similar letters of reference indicate like parts.

A represents a carriage-wheel, which may be constructed in the usual manner, and B is the tire, which is cut or divided, and has its ends $a$ $a$ bent inward or toward the hub of the wheel with a slight hook or curve, as shown in fig. 1. These hooked or curved ends pass through an oblong slot, $b$, in a metal plate, C, which is attached to the exterior of the rim D of the wheel, a mortise or opening, $c$, being made in the rim to receive said ends. To the inner side of the rim D, directly opposite the plate C, there is secured another metal plate, E, which has two openings $d$ made in it to receive each a metal bar, F, said bars being notched to fit on one edge of the openings $d$, and having hooks at their inner ends to catch behind the hooked ends $a$ $a$ of the tire. The bars F are notched at their inner edges, as shown at $e$, and between these notched edges there is fitted a bar, G, which serves to keep the bars F F distended, and their inner ends to clinch firmly the bent ends $a$ $a$ of the tire; and it will be seen by referring to fig. 1 that the ends of the tire may be drawn nearer together, or allowed to separate further apart, by adjusting the bar G nearer to or further from the rim of the wheels, the bars F F being curved or bent in such a manner that their outer ends will be more distended and their inner ends brought nearer together by adjusting the bar G nearer the rim, the reverse being the case when the bar G is adjusted in the opposite direction. Thus by this simple means the pressure of the tire on the rim may be graduated as desired, or as the condition of the wheel requires. The tire, also, is firmly secured on the wheel, and in order to prevent its lateral movement on the rim, a burr may be struck up on its inner surface to penetrate the exterior surface of the rim.

Having thus described my invention, I claim as new, and desire to secure by Letters Patent—

The notched bars F F, in combination with the hooked or bent ends $a$ $a$ of the tire B, and the bar G, fitted between the bars F F, all being arranged and applied to the wheel substantially in the manner as and for the purpose set forth.

The above specification of my invention signed by me this first day of August, 1867.

ANDERS FAGERSTRÖM.

Witnesses:
JOHN SHARPS, Jr.,
HENRY WOODHOUSE.